US009202042B2

(12) United States Patent
Gomez Martinez et al.

(10) Patent No.: US 9,202,042 B2
(45) Date of Patent: Dec. 1, 2015

(54) AUTOMATIC DEVICE PAIRING

(75) Inventors: Feliciano Gomez Martinez, San Jose, CA (US); Joon Bae Kim, Lexington, MA (US); Maulik R. Bhatt, Billerica, MA (US); Esosa Amayo, Cambridge, MA (US)

(73) Assignee: Lantiq Beteiligungs-GmbH & Co.KG, Neubiberg (DE)

( * ) Notice: Subject to any disclaimer, the term of this patent is extended or adjusted under 35 U.S.C. 154(b) by 353 days.

(21) Appl. No.: 13/523,005

(22) Filed: Jun. 14, 2012

(65) Prior Publication Data

US 2012/0324554 A1 Dec. 20, 2012

Related U.S. Application Data

(60) Provisional application No. 61/497,044, filed on Jun. 14, 2011.

(51) Int. Cl.

| | |
|---|---|
| ***H04L 29/06*** | (2006.01) |
| ***G06F 21/44*** | (2013.01) |
| ***G06F 21/31*** | (2013.01) |
| ***H04L 9/08*** | (2006.01) |
| ***H04L 9/32*** | (2006.01) |

(52) U.S. Cl.
CPC .............. *G06F 21/445* (2013.01); *G06F 21/31* (2013.01); *H04L 9/0841* (2013.01); *H04L 9/3226* (2013.01); *H04L 63/08* (2013.01)

(58) Field of Classification Search
CPC ....... G06F 21/31; G06F 21/445; H04L 29/06; H04L 9/3226; H04L 9/0841; H04L 63/08
USPC ............................ 726/6; 455/41.2, 41.3, 410
See application file for complete search history.

(56) References Cited

U.S. PATENT DOCUMENTS

| | | | | |
|---|---|---|---|---|
| 8,494,448 | B2 * | 7/2013 | Bells et al. | 455/41.2 |
| 8,700,035 | B2 * | 4/2014 | Lee | 455/434 |
| 2006/0258289 | A1 * | 11/2006 | Dua | 455/41.3 |
| 2008/0318114 | A1 * | 12/2008 | Lee et al. | 429/34 |
| 2009/0100460 | A1 * | 4/2009 | Hicks et al. | 725/35 |
| 2011/0106954 | A1 * | 5/2011 | Chatterjee et al. | 709/227 |
| 2011/0225640 | A1 * | 9/2011 | Ganapathy et al. | 726/8 |
| 2012/0246331 | A1 * | 9/2012 | Heller et al. | 709/230 |

* cited by examiner

*Primary Examiner* — Mohammad A Siddiqi

(57) ABSTRACT

One embodiment relates to a security apparatus. The apparatus includes a security controller. The security controller is within a secure domain. The controller is configured to receive a trigger event from a first device outside the secure domain and a second trigger event. The controller is configured to automatically generate a secure password from a provisional password using a secure password provisioning protocol in response to the first trigger event and the second trigger event. The controller is also configured to pair the first device with the secure domain by establishing secure communications using the secure password.

27 Claims, 5 Drawing Sheets

| Method # | Password provisioning | Domain Identification | Who can send password | Confirmation |
|---|---|---|---|---|
| 1 | Pre-X.1035 | Bcast-from-domain | SC-only | User-confirmation |
| 2 | Pre-X.1035 | Bcast-from-domain | SC-only | No-confirmation |
| 3 | Pre-X.1035 | Bcast-from-domain | Any-device | User-confirmation |
| 4 | Pre-X.1035 | Bcast-from-domain | Any-device | No-confirmation |
| 5 | Pre-X.1035 | Bcast-from-device | SC-only | User-confirmation |
| 6 | Pre-X.1035 | Bcast-from-device | SC-only | No-confirmation |
| 7 | Pre-X.1035 | Bcast-from-device | Any-device | User-confirmation |
| 8 | Pre-X.1035 | Bcast-from-device | Any-device | No-confirmation |
| 9 | Pre-X.1035 | Trial-and-Error | SC-only | User-confirmation |
| 10 | Pre-X.1035 | Trial-and-Error | SC-only | No-confirmation |
| 11 | Pre-X.1035 | Trial-and-Error | Any-device | User-confirmation |
| 12 | Pre-X.1035 | Trial-and-Error | Any-device | No-confirmation |
| 13 | Post-X.1035 | Bcast-from-domain | SC-only | User-confirmation |
| 14 | Post-X.1035 | Bcast-from-domain | SC-only | No-confirmation |
| 15 | Post-X.1035 | Bcast-from-domain | Any-device | User-confirmation |
| 16 | Post-X.1035 | Bcast-from-domain | Any-device | No-confirmation |
| 17 | Post-X.1035 | Bcast-from-device | SC-only | User-confirmation |
| 18 | Post-X.1035 | Bcast-from-device | SC-only | No-confirmation |
| 19 | Post-X.1035 | Bcast-from-device | Any-device | User-confirmation |
| 20 | Post-X.1035 | Bcast-from-device | Any-device | No-confirmation |
| 21 | Post-X.1035 | Trial-and-Error | SC-only | User-confirmation |
| 22 | Post-X.1035 | Trial-and-Error | SC-only | No-confirmation |
| 23 | Post-X.1035 | Trial-and-Error | Any-device | User-confirmation |
| 24 | Post-X.1035 | Trial-and-Error | Any-device | No-confirmation |

AUTOMATIC DEVICE PAIRING

RELATED APPLICATIONS

This application claims the benefit of U.S. Provisional Application No. 61/497,044, filed Jun. 14, 2011, which is incorporated by reference.

BACKGROUND OF THE INVENTION

Devices of today often need to interact with each other in a secure manner. Mechanisms exist to setup and establish secure communications between multiple devices. One technique to establish a secure architecture is referred to as pairing, whereby a new device is added to a group or set of devices.

Pairing of multiple devices is one technique to securely establish communications between two or more devices. Typically, a common password is entered by a user on each of a pair of devices. Then, the common password is utilized to establish secure communications. Once the secure communications are established, the devices are deemed as "paired".

Pairing is an effective security mechanism. However, user interaction is generally required, passwords must be remembered, and the process can be time consuming.

BRIEF DESCRIPTION OF THE DRAWINGS

FIG. 2 is a table that lists example methods for adding a provisional device or node into a secure domain in accordance with an embodiment.

DETAILED DESCRIPTION OF THE INVENTION

The disclosure includes embodiments that apply to automatic device pairing for systems, such as home network systems. Systems and methods are disclosed that facilitate automatically pairing devices without requiring user interaction. Further, some embodiments include an automatic or interactive confirmation of pairing.

It is often important that devices be able to interact with each other without interference or observation from other devices. Thus, it is important that devices are able to interact with each other in a secure or relatively secure manner. Several techniques exist for establishing secure communications and/or architectures for groups or sets of devices. Pairing of multiple devices is one technique to securely establish communications between two or more devices. Typically, a common password is entered by a user on each of a pair of devices. Then, the common password is utilized to establish secure communications. Once the secure communications are established, the devices are deemed as "paired".

Manually configured pairing systems have some drawbacks. Users are typically forced to remember a password, in case they need to add a new device to the network at a later stage. If the password is easy to remember by the user, this it's likely easy to guess or circumvent by an attacker. Conversely, if the password is hard to guess, it is likely easily forgotten by the user.

Additionally, users must generally use a computer or other display and keyboard device in order to setup their networks in a secure manner. This is inconvenient in scenarios in which users may not have a computer readily available or in scenarios in which connecting the computer to the device being configured is difficult.

Various types of network systems exist that facilitate communication between devices. One type of network system is a home network technology family of standards referred to as G.hn. The G.hn specification defines networking over a variety of mediums including power lines, phone lines and coaxial cables with data rates up to 1 Gbit/s.

The G.hn specification includes a manual pairing technique in order to securely pair or add devices into a secure group of devices, referred to as a domain. The G.hn pairing technique suffers from the above identified limitations.

For illustrative purposes, the below embodiments are described with reference to the G.hn specification. However, it is appreciated that other network systems, including other home networks, are contemplated.

Figure 1:
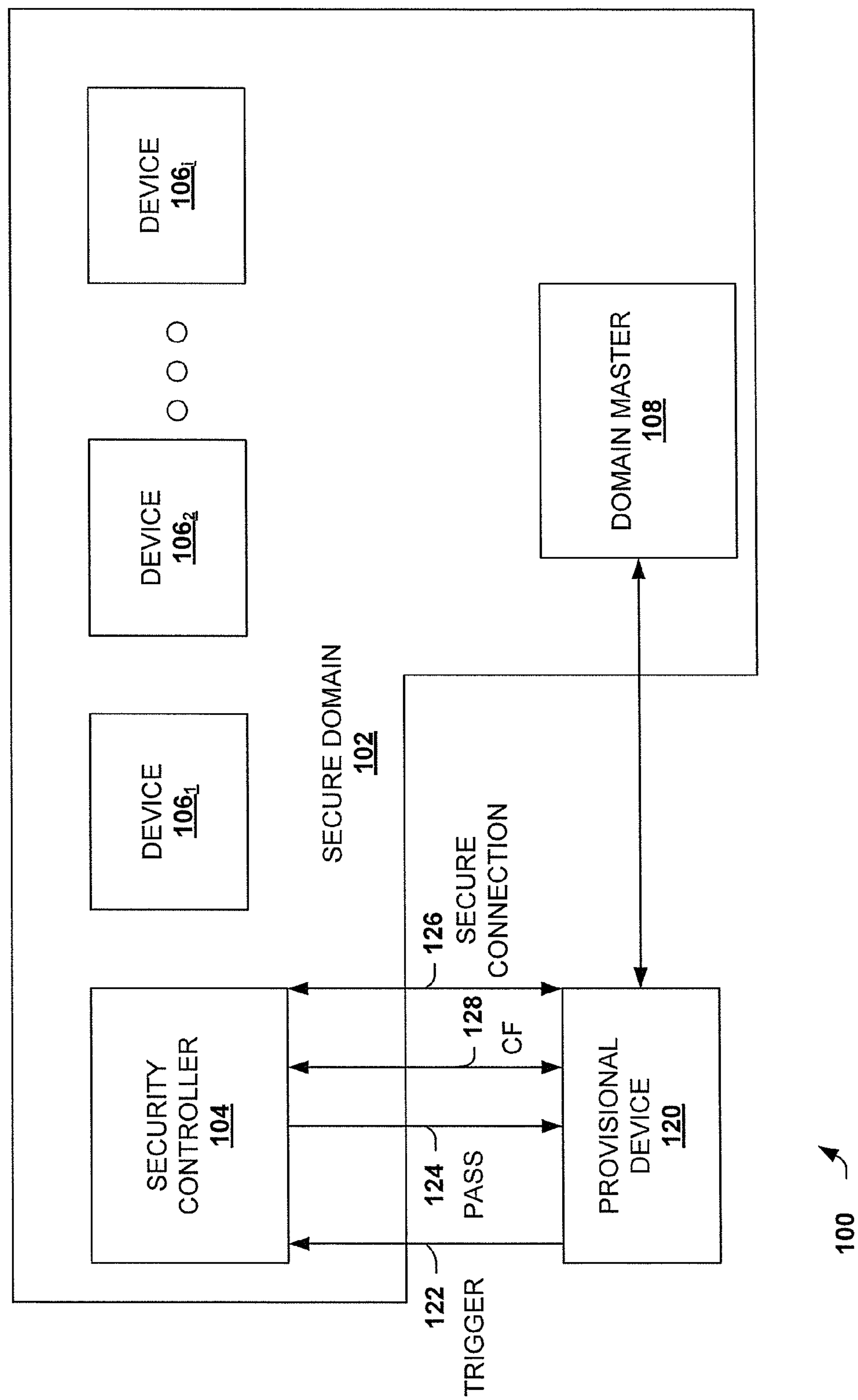
FIG. 1 is a block diagram illustrating a security architecture system for a home network in accordance with an embodiment.

FIG. 1 is a block diagram illustrating a security architecture system 100 for a home network in accordance with an embodiment. The system 100 automatically pairs new devices, referred to as provisional devices, with existing devices.

The system 100 includes a secure domain 102 and a provisional device 120. The secure domain 102 includes a security controller 104, a domain master 108, and one or more devices 106 (106$_1$ to 106$_i$). The provisional device 120 is a new device that is to be added to the secure domain 102. The provisional device 102 can include a computer, laptop, mobile phone, mp3 player, tablet device, and the like.

The security controller 104 manages the security of the secure domain 102. The security controller 104 establishes or facilitates secure communications for devices within the domain 102. The security controller 104 is also responsible for assigning and providing secure passwords to new devices and establishing secure communications with new devices.

The G.hn specification specifies protocols to follow to establish secure communications given a password. The G.hn specification mandates using an X.1035 protocol, which specifies a password-authenticated key agreement protocol that ensures mutual authentication of two parties by using a Diffie-Hellman key exchange to establish a symmetric cryptographic key. The use of Diffie-Hellman exchange ensures forward secrecy, which is a property of a key establishment protocol that guarantees that compromise of a session key or long-term private key after a given session does not cause the compromise of any earlier session.

The X.1035 authentication relies on a pre-shared secret (the password), which is protected (i.e., remains unrevealed) to an eavesdropper preventing an off-line dictionary attack.

The security controller 104 generates and/or provides the password to the provisional device 120 in response to trigger events, such as pushing a button in. Once provided, the security controller 104 uses a protocol, such as the X.1035 protocol, to establish secure communication with the provisional device 120. Once the secure communications are established, the provisional device 120 is part of the secure domain 102 and is paired.

The domain master 108 is responsible for providing access and maintaining membership into a domain. The domain refers to a group or set of devices, including computers, laptops, phones, tablets, and the like. The domain is typically given or assigned a particular name. The domain master 108 may broadcast the domain name, such as by periodically broadcasting the domain name, or maintain it without broadcast. In one example, the domain master 108 maintains an identification table where each of the devices 106 has a unique identification number.

The devices 106 include computers, laptops, TVs, set top boxes, routers, and the like, which are part of the secure domain 102. The devices 106 communicate using one or more of several mediums including, but not limited to, power lines, phone lines, coax cable, and the like. The security controller 104 and the domain master 108 can be separate components or devices from the devices 106. Alternately, the security controller 104 and/or the domain master 108 functionality can be performed by one or more of the devices.

Initially, the provisional device 120 is not part of the secure domain 102. The provisional device 120 could, for example, be a new laptop to be added to a home network. A trigger event 122 initiates a pairing process and involves a trigger from the provisional device 120 and a device within the secure domain 102, such as the security controller 104. The trigger event 122 can include pressing a button on the provisional device 120 and a button on the security controller 104, powering on devices, sending a message from one of the devices 106, and the like.

The trigger event 122 is received by the security controller 104, which initiates a security protocol to add the device 120 to the secure domain 102. The security controller 104 determines whether the provisional device 102 should be added to the secure domain 102. On deciding that the device 120 should be added, a provisional password is shared between the security controller 104 and the provisional device 120. The provisional password can be encrypted. The security controller 104 generates and/or provides a secure password 124 to the provisional device 120. In one example, a Diffie-Hellman exchange is utilized to generate and provide the password, also referred to as a key. The Diffie-Hellman exchange can be part of an X.1035 protocol.

Once the password 124 is received by the provisional device 120, the provisional device 120 stores the secure password 124. The provisional device 120 utilizes the secure password 124 to establish secure communications with a device within the secure domain 102. Thus, the provisional device is automatically paired with the device and/or the secure domain 102.

In one example, the secure connection is established using the X.1035 protocol and complies with the G.hn standard. The secure connection 126 permits secure communications with the devices 106.

The security controller 104 can optionally require confirmation 128 prior to establishment of the secure connection 126. The confirmation 128 provides a safeguard that or verification that the provisional device 120 is should join the secure domain 102. The confirmation 128 adds an additional level of security.

The confirmation 128 can be provided in a variety of manners. In one example, a confirmation button is pressed on the security controller 104 in order to confirm joining of the secure domain 102. In another example, an interactive response is required to confirm joining of the provisional device 120 to the secure domain 102. In yet another example, a timer is set and confirmation is needed prior to expiration of the timer. In another example, a timer is set and confirmation is assumed at expiration of the timer.

FIG. 2 is a table 200 that lists example methods for adding a provisional device or node into a secure domain in accordance with one or more embodiments. The system 100 is referenced to facilitate understanding. Additionally, the listed methods and variations can be implemented in conjunction with the system 100.

A column of the table 200 includes two mechanisms for password provisioning, which indicates a mechanism that a security controller 104 uses to generate and provide a password to the provisional device or node 120. In this example, password provisioning provides two possible mechanisms for generating or provisioning passwords by the security controller 104. A first is using a Diffie-Hellman (DH) key exchange protocol. When the DH process is completed, both devices, the security controller 104 and the provisional device 120, agree on a shared secret number that is kept secret from other devices. The security controller 104 uses the shared secret as an encryption key to deliver the password 124 to the provisional device 120 in an encrypted manner. Once both devices have the password 124, an authentication process is followed, such as an X.1035 authentication process.

A second mechanism is referred to as a post-X.1035 mechanism. The security controller 104 and the provisional device 120 perform a X.1035 key exchange using a predetermined and not secret password. The password is a known and agreed password, such as all zeros, all ones, 0x123456, and the like. The X.1035 includes a DH exchange at the end for the X.1035 protocol and both devices agree on a shared secret number, referred to as NSC in G.hn, which is kept secret from other devices. The security controller 104 uses the shared secret as an encryption key to deliver the password to the provisional device 120.

The domain identification column of the table 200 includes three mechanisms for identifying or attempting to identify the secure domain 102 to which the provisional device 120 should join. A first mechanism for identifying is broadcast from the device, where the provisional device 120 broadcasts a message over a network medium requesting to join a domain. Any of the devices in the secure domain 102, such as the security controller 104, can respond with a message indicating that the provisional device 120 can join the domain 102 and initiates the pairing process.

A second mechanism for identifying is a broadcast from the domain, which is a broadcast from a device of the domain 102 that announces the presence and name of the domain 102. The device could be the security controller 104 or the domain master 108. The broadcast message states that the domain is present and is willing to perform the password provisioning process.

A third mechanism for identifying is referred to as trial and error. Here, the provisional device 120 compiles a list of available security domains. Then, the provisional device 120 sends or relays a trigger to available domains until one is found that initiates the password provisioning process.

Another column of the table 200 indicates which device of the secure domain 102 can send the password 124 to the provisional device 120. There are two options specified that are followed after a successful password provisioning protocol is performed. A first is that only the security controller 104 can send the password 124. Thus, the password provisioning protocol can only run between the security controller 104 and the provisional device 120. If a trigger event is initiated with another device of the domain 102, then the other device acts as a proxy to send a message to the security controller 104 indicating that the security controller is to initiate the password provisioning protocol. While the protocol is running, the other device or proxy device is responsible for providing user interface functions, such as buttons, visual indicators, and the like, to a user. The security controller 104 sends messages to the proxy device to controller the appearance of the user interface, such as parameters of the visual indicators.

A second option for sending the password 124 to the provisional device 120 is that any device within the secure domain 102 can perform the password provisioning protocol. Here, involvement of the other device with the security controller 104 is not required.

Another column of table 100 lists two options for handling confirmation of a pairing process, typically before the password 124 is sent to the provisional device 120. A first option is that no confirmation is required. Upon a trigger event, the password provisioning process is initiated and the password 124 is provided to the requesting device, the provisional device 120.

A second option is that confirmation is required. Here, a sensor or other mechanism can be utilized to provide feedback to a user about the password provisioning process being completed. A common shared key can be used as a parameter for generating a common LED blinking pattern, so that a user can identify devices that have been paired with each other. The secure password 124 is not provided to the provisional device 120 until confirmation 128 is received from a user. In one example, one of the devices of the secure domain 102 and the provisional device 120 require confirmation before transmittal of the password 124.

Figure 3:
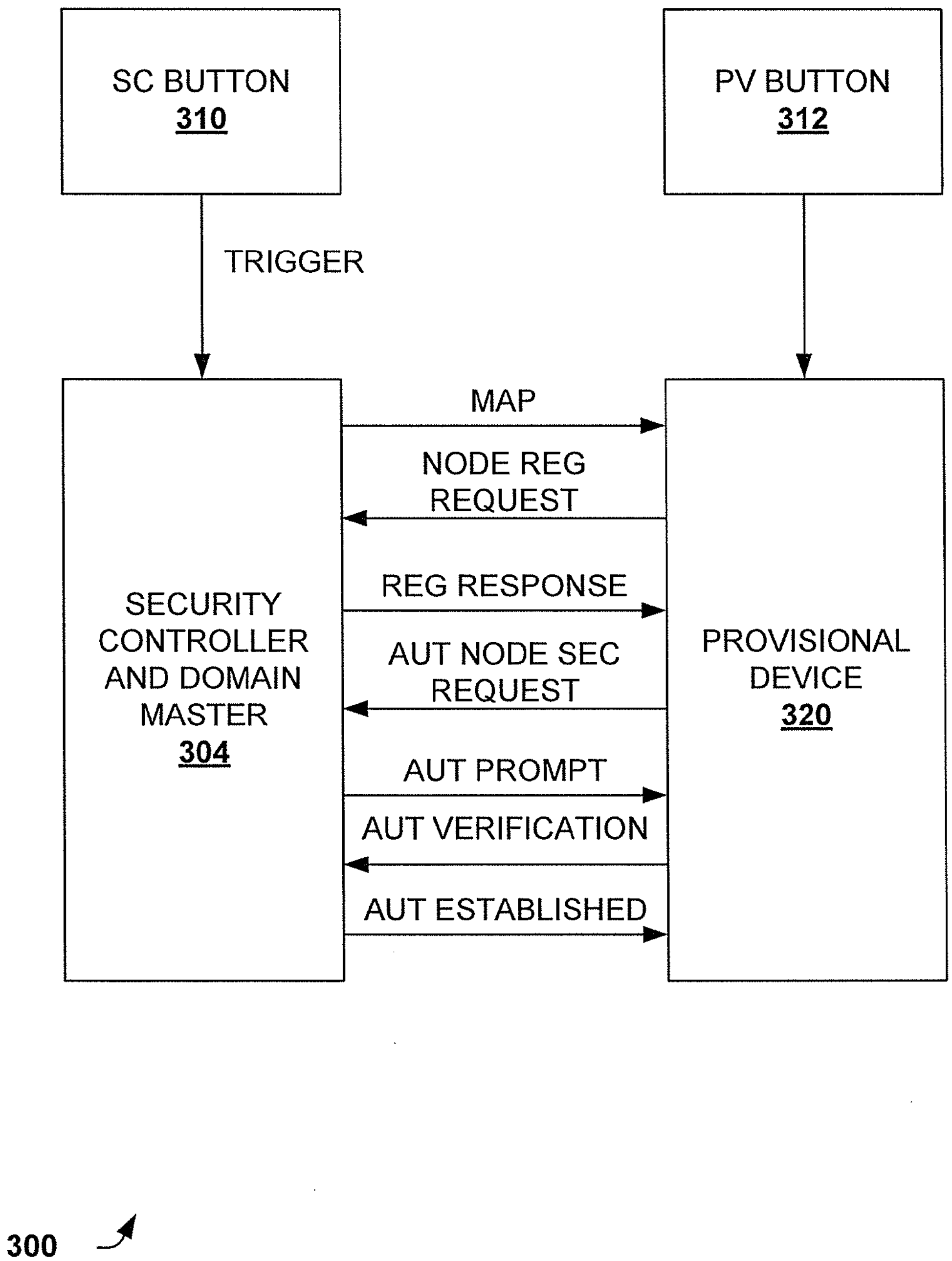
FIG. 3 is a block diagram illustrating a security architecture system for a home network in accordance with an embodiment.

FIG. 3 is a block diagram illustrating a security architecture system 300 for a home network in accordance with an embodiment. The system 300 automatically pairs new devices, referred to as provisional devices, with existing devices. The system 300 references system 100 and the table 200, described above. The system 300 is provided as an example with details provided in order to facilitate an understanding one or more embodiments. It is appreciated that many of these details can vary for other embodiments.

The system 300 includes an integrated security controller and domain master 304, an SC button 310, a provisional device 320, and a PV button 312. The integrated security controller 304 includes both the security controller and domain master (SCDM) functionality, described above. The SC button 310 is utilized for responding or inputs and can also be illuminated to indicate information.

In this example, G.hn network devices comprise the integrated security controller 304 and the provisional device 320. The devices utilize a 1 G.hn home networking interface and can optionally utilize one or more Ethernet interfaces. A default/provisional password for pairing is set at 0x123456. No confirmation is required. After pairing, all devices use the same password.

In this example, a user purchases two devices. Both are connected and plugged in, in random order. A first of the two devices becomes the security controller 304 and creates a domain with the name “HomeGrid” and registers the domain. The SCDM 304 begins broadcasting the domain name via the (MAP).

A second of the two devices becomes the provisional device 320. The provisional device 320 listens for a domain being broadcast and detects that “HomeGrid” is available. The provisional device 320 requests to register (NODE REGISTER REQ) with the domain “HomeGrid”. The SCDM 304 registers the provisional device 320 with the domain (REG RESPONSE), but does not yet establish a secure domain/architecture.

The domain at this point is not secure, so authentication is not performed. A security LED or indicator is OFF in both devices. The devices can interact or communicate, however the communications are not secure.

In order to create a secure domain/architecture, a trigger event is initiated by pressing the SC button 310. The SCDM 304 creates a new domain with a random name and security enabled. A common network password is randomly generated. A registration code in MAP is set to 0x987654. A security indicator is flashing in the SCDM 304, which indicates it is looking for another device to pair with. The PV button 312 is pressed and flashes to indicate it is also looking for a device to pair with. The secure domain 0x987654 is detected and the provisional device 320 attempts to join by initiating a trigger event. Authentication is attempted with password 0x123456.

The SCDM 304 performs a password provisioning process by performing the X.1035 provisioning process and agreeing on an NSC key. The SCDM 304 sends the network password to the provisional device 320. Authentication is complete and the secure domain/architecture is established (AUT ESTABLISHED).

Figure 4:
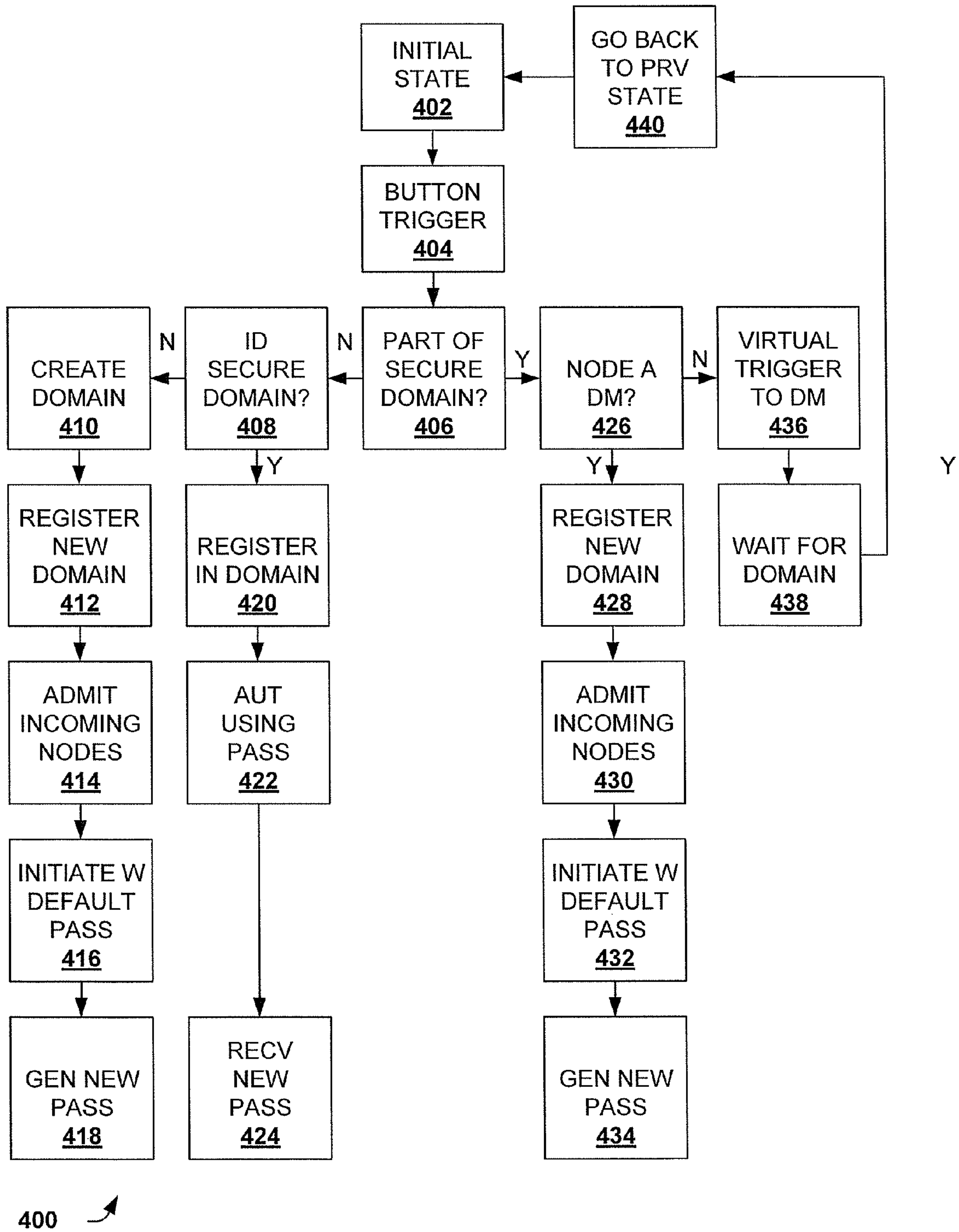
FIG. 4 is a high level diagram illustrating a security architecture sequence of events for a home network in accordance with an embodiment.

FIG. 4 is a high level diagram illustrating a security architecture sequence of events 400 for a home network in accordance with an embodiment. The sequence 400 can be read in conjunction with the embodiments described elsewhere.

The sequence 400 begins wherein a device, referred to as a provisional device, is in an initial state 402. In one example, the device is a new device to a household. A trigger event 404 occurs that indicates or selects joining a domain or network domain. In one example, the trigger event 404 is pressing a button, physical or virtual, on the provisional device. The trigger event 404 also indicates that secure communications or a secure domain is required by the provisional device.

A determination is made as to whether the provisional device is part of a secure domain at 406. If it is not part of a secure domain, a check is made to determine if a secure domain is available at 408. If a secure domain is not available at 408, a secure domain is created at 410. The secure domain is created with a random domain name. The provisional device also becomes a domain master and a security controller. The secure domain uses broadcast messages to announce that it is accepting incoming nodes at 412.

An additional device can be admitted to the secure domain at 414, where incoming nodes or devices are admitted. A secure password provisioning process is initiated at 416 using a default or provisional password. In one example, the provisional password is known by the additional device. The secure password is generated and provided to the additional device at 418 and secure communications are established.

Returning to sequence 408, if a secure domain is identified, a request to register with the secure domain is made at 420. A domain master processes the request and permits registration in this example. Then, a secure password provisioning process is initiated using a default or provisional password at 422. A security controller of the secure domain generates and provides a secure password, which is received by the provisional device at 424. A secure communication with the secure domain is then established.

Returning to sequence 406, if the provisional device is part of a secure domain, a determination is made as to whether the device is a domain master and security controller (DMSC) at 426. If the provisional device is the DMSC at 426, it announces at 428 via broadcast message that it is accepting incoming connections. In one example, the G.hn domain announces accepting incoming connections by setting a predefined value (such as 0x987654) in the Registration Code field in the G.hn MAP message. An additional device/node can be admitted at 430, typically in response to the broadcast secure domain announcement. It is appreciated that other additional devices can also be admitted. A secure password provisioning process is initiated at 432 using a default or provisional password. At sequence 434, the secure password is provided to the provisional device and secure communications are established.

Returning to sequence 426, if the provisional device is not a domain master and security controller (DMSC), a virtual trigger or message is sent to the DMSC for the secure domain at 436. The device then waits for further action from the DMSC and can follow secure password provisioning process, such as described above. Eventually, the provisional device can return to the initial state or sequence 402.

It is appreciated that variations in the sequence of events 400 are contemplated. For example, confirmation of the pairing process can be implemented immediately prior to providing or receiving the secure password.

Figure 5:
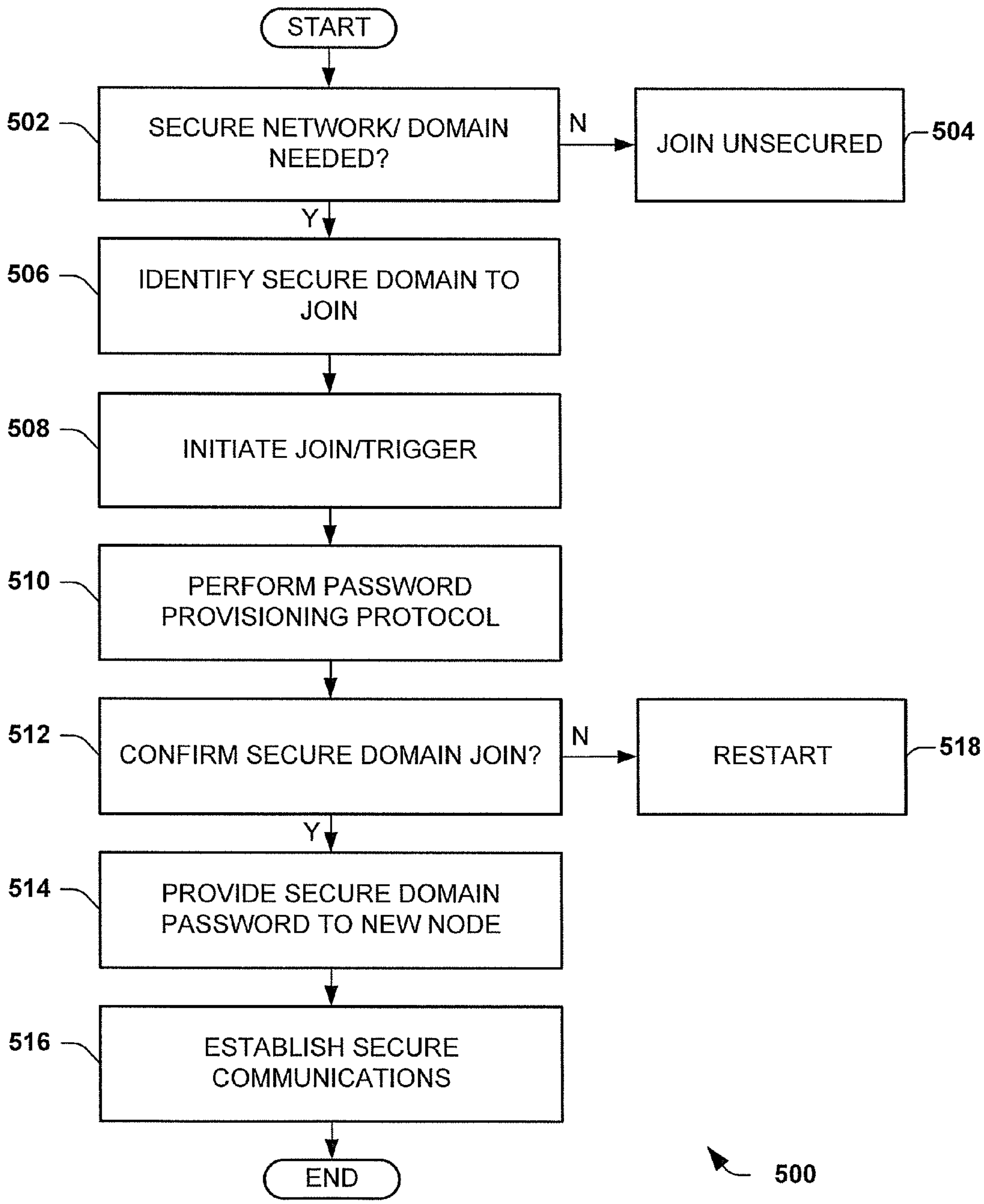
FIG. 5 is a flow diagram illustrating a method of establishing a secure domain or architecture in accordance with an embodiment.

FIG. 5 is a flow diagram illustrating a method 500 of establishing a secure domain or architecture in accordance with an embodiment.

The method 500 begins at block 502, wherein a determination on whether a secure domain/network is desired or needed for a provisional device. Some devices and functionality can operate without a secure domain. In the event a secure domain is not needed, the device joins an unsecure domain at block 504. The provisional device can include computers, laptops, TVs, set top boxes, routers, and the like.

On determining that a secure domain is needed or desired, a secure domain to join is identified at block 506. The secure domain can be pre-existing, in one example. In another example, the secure domain is created by a suitable mechanism.

The secure domain can be identified or selected from a list of possible secure domains. The list can include capabilities and/or characteristics for the possible secure domains. If so, the capabilities are analyzed to determine which of the list of possible secure domains should be selected or identified.

A trigger event is generated at block 508 that requests joining the identified secure domain. The trigger event can be initiated automatically, such as by powering on the device. Additionally, the trigger event can be initiated by pressing a button on the provisional device or another device that initiates the trigger event.

The trigger event is received directly or indirectly by a security controller which denies or accepts the trigger event. If accepted, a secure password provisioning protocol is performed at block 510. The secure password provisioning protocol can be performed using a default password, also referred to as a provisional password.

The provisional password can be pre-determined and/or randomly generated. In one example, the provisional password is shared for a relatively short time period without encryption by the provisional device. In another example, the provisional password is shared with encryption so only the security controller can access it. In another example, the provisioning password is pre-existing and known by the provisional device. It is also appreciated that the secure password provisioning protocol can comply with X.1035 standard.

A confirmation for joining the secure domain is initiated at block 512. The confirmation checks to ensure that the pairing of the provisional device with the secure domain is a desired action. In one example, confirmation is performed on a device already within the secure domain. In another example, a confirmation button is pressed on the provisional device to verify the pairing. In yet another example, a timer is initiated and failure to cancel pairing before the timer expires operates as confirmation.

The confirmation can include providing a visual indication indicating that a secure connection with a named security domain name is ready to occur.

If the confirmation is not received, a restart of the method 500 can be performed at block 518. This could occur, for example, on a user preferring another secure domain.

The generated secure domain password is provided to the provisional device at block 514. The secure domain password is provided by a security controller or a proxy for the security controller.

The secure domain password is utilized to establish secure communications over one or more mediums at block 516. The one or more mediums include, for example, power line networks, coaxial cable, twisted pair wiring, and the like.

In one example, the provisional password is obtained using a DH procedure. The provisional device, a recipient sends a "AKM_PWResKey.ind" message which contains 1024 bit number (A).

$$A=g^{RA} \bmod p.$$

Values of g and p are same as used in authentication protocol (PAK). RA is a 384 bit random number generated by recipient. RA is only known by the recipient and is never known by the provider.

On reception of the indication message the provider calculates its own 1024 bit number (B) and sends it via the "AKM_PWProKey.res" message.

$$B=g^{RB} \bmod p.$$

Value and size of g and p is same as used in authentication protocol (PAK). RB is a 384 bit random number generated by provider. RB is only known by the provider and is never known by the recipient.

Both devices calculate the encryption key K at this point.

$$K=g^{RA\,RB} \bmod p=B^{RA} \bmod p=A^{RB} \bmod p$$

The lower 128 bits of the output shall be used as the key K. This is a temporary key which is only used to encrypt the password provisioning messages.

All the messages in Diffie-Hellman Key Exchange protocol are also sent unencrypted in unicast or broadcast mode.

The recipient sends an "AKM_PWGet.req" message encrypted by the temporary key K requesting the password. On receiving the request the provider does the following:

If the provider is already part of a multi node secure network it provides the recipient with the stored password, domain name and current security mode of the network. If the provider is not part of a secure network or is a standalone node then it generates a random password and domain name and conveys it to the recipient in the "AKM_PWSet.cnf". The message also includes the security mode which shall be NMK based security by default.

Understanding of the method 500 can be enhanced by utilizing the above systems and devices. However, the method 500 and variations thereof can be implemented using devices and systems varied from the above.

While the above method 500 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

One embodiment relates to a security apparatus. The apparatus includes a security controller. The security controller is within a secure domain. The controller is configured to receive a trigger event from a first device outside the secure domain and a second trigger event. The controller is configured to automatically generate a secure password from a provisional password using a secure password provisioning protocol in response to the first trigger event and the second trigger event. The controller is also configured to pair the first device with the secure domain by establishing secure communications using the secure password.

Another embodiment relates to a security architecture system. The system includes a first device and a security controller. The first device is configured to initiate a trigger event. The security controller is within a secure domain. The security controller is configured to automatically provide a secure domain password to the first device in response to the trigger event.

Another embodiment relates to a device having a processor and a memory. The memory includes processor executable instructions. The instructions when executed by the processor perform the following. The executed instructions broadcast a message identifying a secure domain. They receive a message indicating that a device is ready to perform secure password provisioning. The executed instructions automatically share a provisional password. Additionally, they utilize the provisional password to perform the secure password provisioning and to generate a secure domain password.

Another embodiment relates to a method of establishing a secure architecture. A secure domain is identified. A request to join the identified secure domain is triggered. A provisional password is shared. A secure password provisioning protocol is performed to generate a secure password. The secure password is provided. Secure communications are established using the secure password.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A security apparatus comprising:

a security controller within a secure domain, the security controller configured to receive a first trigger event from a first device caused by pushing a first button at the first device outside the secure domain and a second trigger event caused by pushing a second button at the security controller, to automatically generate a secure password from a provisional password using a secure password provisioning protocol in response to the first trigger event and the second trigger event, and to pair the first device with the secure domain by establishing secure communications with the secure password.

2. The apparatus of claim 1, wherein the secure domain is part of a home network.

3. The apparatus of claim 2, wherein the home network complies with the G.hn home networking standard.

4. The apparatus of claim 3, wherein the provisional password is a secret number.

5. The apparatus of claim 2, wherein the provisional password is received from the first device.

6. The apparatus of claim 1, further comprising a domain master within the secure domain, wherein the domain master maintains a secure domain name for the secure domain.

7. The apparatus of claim 6, wherein the domain master is configured to broadcast the secure domain name.

8. The apparatus of claim 6, wherein the domain master pairs devices logically upon completion.

9. The apparatus of claim 1, wherein the first device is configured to select the secure domain from a list of available secure domains according to capabilities.

10. The apparatus of claim 1, wherein the first device is configured to await confirmation prior to utilizing the secure domain password to establish secure communications with the secure domain.

11. The apparatus of claim 1, wherein the security controller includes a button to confirm that the password can be provided to the first device.

12. The apparatus of claim 1, wherein the security controller is configured to provide the secure password to the first device upon receiving confirmation.

13. The apparatus of claim 1, wherein the pairing comprises establishing a cryptographic key using the secure password.

14. The apparatus of claim 1, wherein the key is symmetric.

15. A device comprising:

a processor; and a memory including processor executable instructions, the instructions when executed by the processor to:

receiving a pushing of a second button of the device, broadcast a message identifying a secure domain;

receive a message indicating that a device is ready to perform secure password provisioning caused by pushing a first button at a joining device;

automatically share a provisional password; and utilize the provisional password to perform the secure password provisioning and generate a secure domain password, and establishing secure communications with the domain using the secure domain password.

16. The device of claim 15, wherein the processor executable instructions further include communicating the secure domain password.

17. The device of claim 15, wherein the processor executable instructions further include receiving user confirmation prior to establishing securing communications using the secure domain password.

18. A method of establishing a secure architecture, the method comprising:

identifying a secure domain;

triggering a request to join the secure domain by pushing a first button of a joining device;

receiving a pushing of a button at a security controller;

sharing a provisional password;

performing a secure password provisioning protocol to generate a secure password;

providing the secure password; and establishing secure communications using the secure password.

19. The method of claim 18, wherein identifying the secure domain includes broadcasting an identification for the secure domain by a domain controller and selecting the secure domain.

20. The method of claim 18, wherein identifying the secure domain includes selecting the secure domain from a list of available domains.

21. The method of claim 18, wherein triggering a request to join the secure domain comprises pushing a button on a provisional device.

22. The method of claim 18, wherein triggering a request to join the secure domain comprises pushing a button on a provisional device and a button on a second device already within the secure domain.

23. The method of claim 18, wherein sharing a provisional password comprises providing the provisional password for a relatively short time period.

24. The method of claim 18, further comprising providing confirmation prior to establishing secure communications.

25. The method of claim 18, further comprising storing the secure password.

26. The method of claim 18, wherein establishing secure communications comprises pairing a provisional device with a second device within the secure domain.

27. The method of claim 18, wherein establishing secure communications comprises pairing a provisional device with a second device and a third device.

* * * * *